(12) United States Patent
Seki

(10) Patent No.: US 8,804,179 B2
(45) Date of Patent: Aug. 12, 2014

(54) INFORMATION PROCESSING SYSTEM, INFORMATION PROCESSING METHOD, AND STORAGE MEDIUM

(71) Applicant: Canon Kabushiki Kaisha, Tokyo (JP)

(72) Inventor: Hirotaka Seki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/946,786

(22) Filed: Jul. 19, 2013

(65) Prior Publication Data

US 2014/0022593 A1 Jan. 23, 2014

(30) Foreign Application Priority Data

Jul. 23, 2012 (JP) ................................ 2012-162833

(51) Int. Cl.
*G06F 3/12* (2006.01)
*G06F 15/16* (2006.01)
*G06F 13/00* (2006.01)

(52) U.S. Cl.
USPC ........... 358/1.15; 709/208; 709/209; 710/110

(58) Field of Classification Search
None
See application file for complete search history.

(56) References Cited

U.S. PATENT DOCUMENTS

2006/0036704 A1\* 2/2006 Kanekawa et al. ........... 709/208
2008/0282007 A1\* 11/2008 Moran et al. .................. 710/110

FOREIGN PATENT DOCUMENTS

JP 63-224545 9/1988

\* cited by examiner

*Primary Examiner* — Marcus T Riley
(74) *Attorney, Agent, or Firm* — Canon U.S.A., Inc. IP Division

(57) ABSTRACT

The information processing system includes an arithmetic processing unit, a master control unit including a master memory, and slave control units each including a slave memory. The master control unit stores in a master memory transmission data including address information that can designate the address of any one of the master memory and the slave memory, which is sent from the arithmetic processing unit, or transmits the transmission data to the corresponding slave memory via a communication data memory. Such the information processing system can reduce the number of times of directions from the master control unit to the slave control unit.

9 Claims, 7 Drawing Sheets

INFORMATION PROCESSING SYSTEM, INFORMATION PROCESSING METHOD, AND STORAGE MEDIUM

BACKGROUND OF THE INVENTION

1. Field of the Invention

The present invention relates to an information processing system including an arithmetic processing unit, a master control unit for executing processing in accordance with an instruction from the arithmetic processing unit, and a slave control unit for controlling a load in accordance with an instruction from the arithmetic processing unit.

2. Description of the Related Art

An image forming apparatus using electrophotography includes a plurality of functions necessary for image formation, such as a conveying function to convey a recording material such as a sheet, an image forming function to generate an image, and a fixing function to fix an image on a recording material. When those functions are achieved by a single central processing unit (CPU), the processing load of the CPU increases, thus making the overall processing slow. In addition, arrangement of wiring from the CPU to a board where an actuator such as a motor is connected becomes complicated. Therefore, it is desired to execute distributed control on the operation of the image forming apparatus by using a plurality of control modules that achieve those functions. Each control module includes a CPU that executes processing for achieving the associated function.

Serial communications are sometimes used for transmission and reception of data between the CPUs of the plurality of control modules. As the number of loads such as motors controlled by the respective CPUs increases, a frequency of a control instruction using serial communications increases. Therefore, in addition to memory used for a transmission instruction through the serial communications, memory for addresses and data for respective control modules used for the control instruction increases, which leads to a cost increase. Further, the CPU needs to wait for the next transmission until the serial communications are completed, which leads to reduction in productivity. Japanese Patent Application Laid-Open No. 63-224545 proposes a technology for effectively using memory by requesting a transmitting end to pause the transmission when the memory for transmission through the serial communications has no room.

In a data communication technology using the serial communications disclosed in Japanese Patent Application Laid-Open No. 63-224545, the communications are stopped more frequently as an amount of data being transmitted increases. Therefore, when the technology disclosed in Japanese Patent Application Laid-Open No. 63-224545 is applied to an image forming apparatus, there is a problem in that, for example, jamming or the like occurs due to a delay in control of a motor for conveying a recording material. Increasing a capacity of memory as a countermeasure against the above-mentioned problem leads to the cost increase, which is not preferred for merchandise.

SUMMARY OF THE INVENTION

In order to solve the above-mentioned problem, according to an exemplary embodiment of the present invention, there is provided an information processing system, including an arithmetic processing unit, a master control unit configured to execute processing in accordance with an instruction from the arithmetic processing unit, and a slave control unit comprising a slave memory, configured to control a load in accordance with the instruction from the arithmetic processing unit. A first communication line configured to connect the arithmetic processing unit to the master control unit. A second communication line configured to connect the master control unit to the slave control unit. The master control unit comprises an address decoder, a master memory, and a communication data memory. The arithmetic processing unit configured to transmit a write command, address information in a system address space, and data to the master control unit via the first communication line. The address information in the system address space is information for designating an address in a system address space being a space obtained by integrating a master memory address space of the master memory and a slave memory address space of the slave memory. The address decoder comprised in the master control unit configured to analyze the address information in the system address space received from the arithmetic processing unit, and to select a writing destination for the data received from the arithmetic processing unit. The master control unit configured to write, when the address decoder selects the master memory as the writing destination, the data received from the arithmetic processing unit to the address of the master memory address space of the master memory corresponding to the address information in the system address space, and executes the processing based on the data written to the master memory. Further, the master control unit configured to generate, when the address decoder selects the slave memory as the writing destination, address information on the slave memory address space based on the address information in the system address space, to write the write command, the address information on the slave memory address space, and the data to the communication data memory, and to transmit the write command, the address information on the slave memory address space, and the data written to the communication data memory to the slave control unit via the second communication line.

Further features of the present invention will become apparent from the following description of exemplary embodiments (with reference to the attached drawings).

DESCRIPTION OF THE EMBODIMENTS

In the following, an embodiment is described in detail referring to the accompanying drawings.

Figure 1:
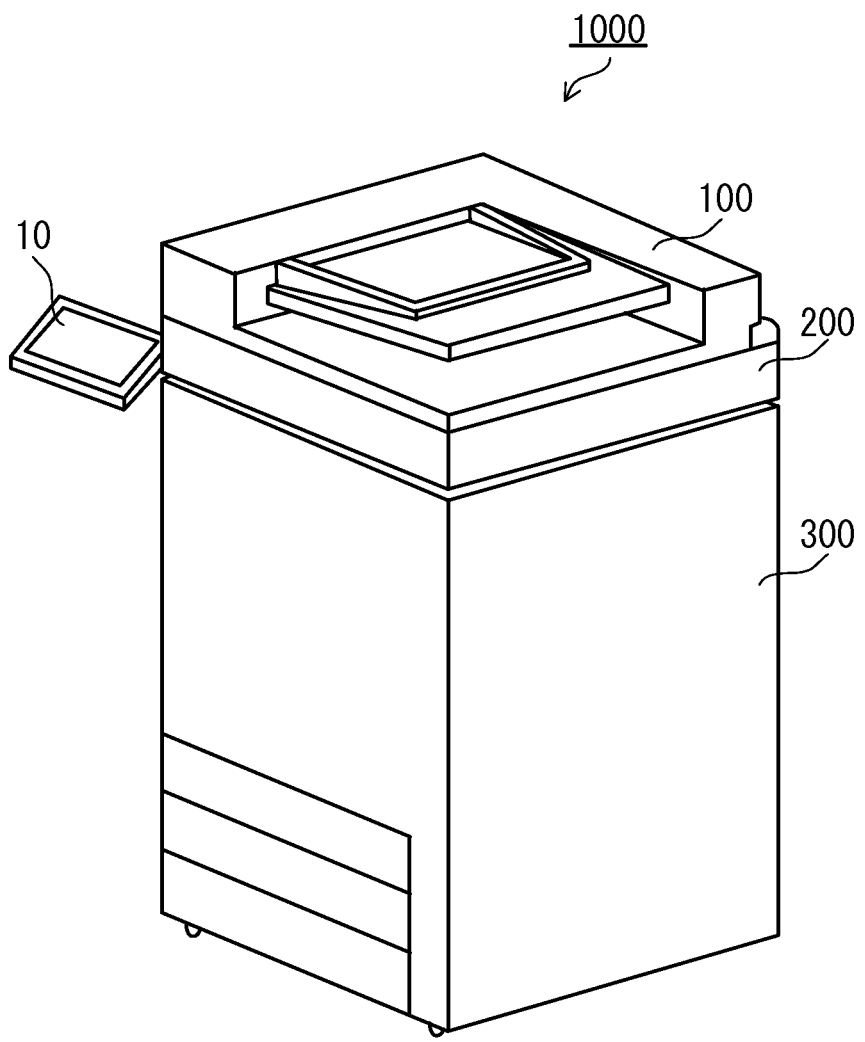
FIG. 1 is a schematic view of an image forming apparatus according to an embodiment of the present invention.

FIG. 1 is a schematic perspective view of an image forming apparatus 1000 to which a serial communication apparatus according to this embodiment is applied.

The image forming apparatus 1000 includes an auto document feeder (ADF) 100, an image scanner 200, an image forming unit 300, and an operation unit 10. The image scanner 200 is provided on the image forming unit 300. The ADF 100 is mounted on the image scanner 200. Those components of the image forming apparatus 1000 are controlled in a distributed manner by a plurality of control units. A CPU, a dedicated semiconductor device, or the like can be used for each control unit.

The ADF 100 automatically conveys a document onto a document glass. The image scanner 200 scans the document conveyed from the ADF 100, and outputs image data. The image forming unit 300 forms an image, on a recording material such as paper, based on the image data output from the image scanner 200 or image data input from an external device over a network. The operation unit 10 has a graphical user interface (GUI) for allowing a user to perform various operations. The operation unit 10 has a display equipped with, for example, a touch panel, so as to be able to display information to the user.

(Image Forming Unit)

Figure 2:
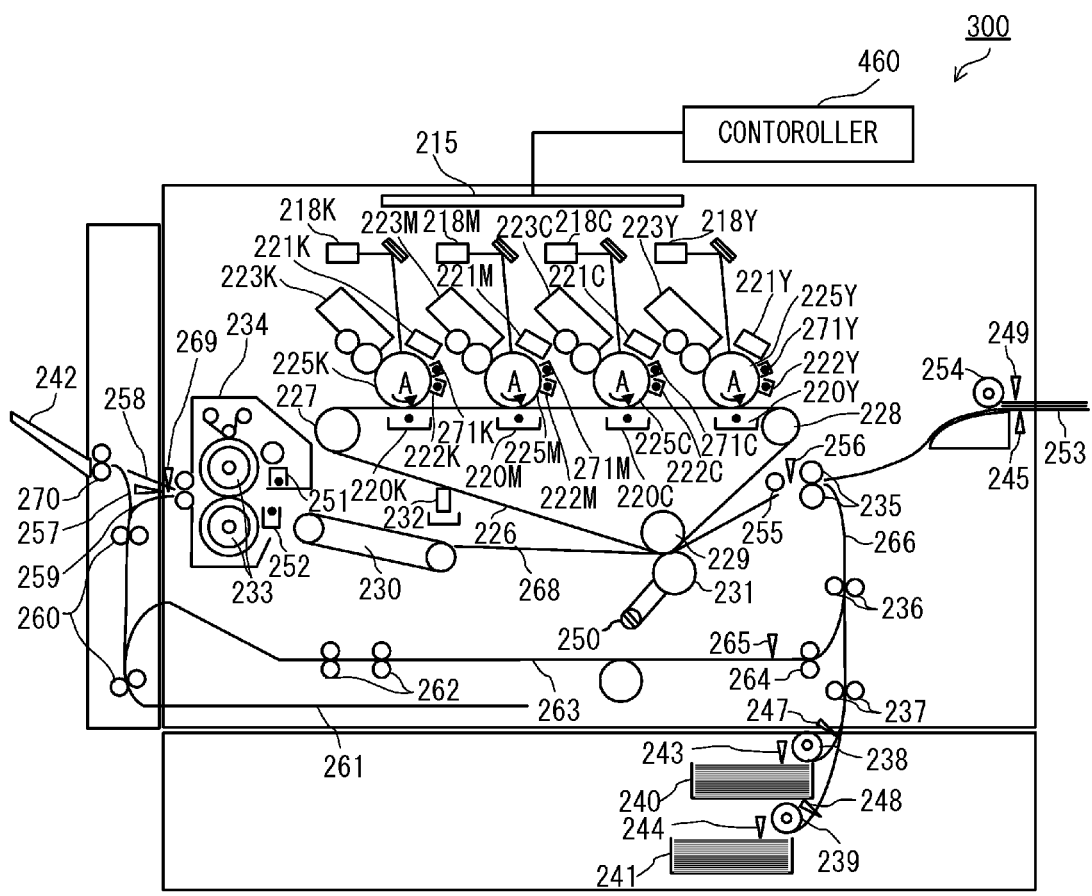
FIG. 2 is a detailed configuration view of an image forming unit.

FIG. 2 is a detailed configuration view of the image forming unit 300. The image forming unit 300 adopts electrophotography. In FIG. 2, alphabets Y, M, C, and K at the ends of reference numerals respectively represent colors of yellow, magenta, cyan, and black. The alphabets Y, M, C, and K at the ends of reference numerals are omitted in the following description in a case where all the colors are referred to in the description.

Photosensitive drums (hereinafter referred to as "photosensitive members") 225 are rotated in a direction of an arrow A in FIG. 2 by drive power from motors. A primary charging unit 221, an exposure unit 218, a developing unit 223, a transfer unit 220, a cleaner unit 222, and a deelectrifying unit 271 are provided around each photosensitive member 225.

The developing unit 223K is a developing module for monochromatic development, and develops an electrostatic latent image formed on the photosensitive member 225K with black toner. The developing units 223Y, 223M, and 223C are developing modules for color development. The developing units 223Y, 223M, and 223C respectively develop electrostatic latent images formed on the photosensitive members 225Y, 225M, and 225C with toners of yellow, magenta, and cyan. The toner images of the individual colors developed on the photosensitive members 225 are multi-transferred onto a transfer belt 226 serving as an intermediate transfer member by the transfer units 220 so that the toner images of the four colors are placed one on another.

The transfer belt 226 is stretched around rollers 227, 228, and 229. The roller 227 is a drive roller that drives the transfer belt 226 with drive power from a drive source. The roller 228 is a tension roller that adjusts the tension of the transfer belt 226. The roller 229 is a backup roller for a transfer roller as a secondary transfer unit 231. A transfer-roller attachment/detachment unit 250 is a drive unit for causing the secondary transfer unit 231 to come into contact with and move away from the transfer belt 226. A cleaner blade 232 is provided under the transfer belt 226 after passing the secondary transfer unit 231 to scrape the residual toner off the transfer belt 226.

Recording materials are stored in cassettes 240 and 241 and a manual feed unit 253. One of the stored recording materials is fed to a contact portion (nip portion) between the secondary transfer unit 231 and the transfer belt 226 by a pair of sheet feed rollers 235 and a registration roller 255. At this time, the secondary transfer unit 231 is brought into contact with the transfer belt 226 by the transfer-roller attachment/detachment unit 250. The toner image formed on the transfer belt 226 is transferred on the recording material at the nip portion. The toner image transferred on the recording material is thermally fixed thereon by a fixing unit 234. The recording material having the toner image fixed thereon is discharged outside.

The cassettes 240 and 241 and the manual feed unit 253 respectively include detection sensors 243, 244, and 245 for detecting whether or not a recording material is present. The cassettes 240 and 241 and the manual feed unit 253 respectively include sheet feed sensors 247, 248, and 249 to detect improper pickup of the recording material. The recording materials stored in the cassettes 240 and 241 are picked up one by one and conveyed via a pair of vertical path rollers 236 and 237 to the pair of sheet feed rollers 235 by pickup rollers 238 and 239. The recording materials stored in the manual feed unit 253 are picked up one by one and conveyed to the pair of sheet feed rollers 235 by a pickup roller 254.

The image forming operation of the image forming unit 300 is described below. In response to an instruction to start image formation, the recording material stored in the cassettes 240, 241 or the manual feed unit 253 are conveyed to the pair of sheet feed rollers 235 one by one by the pickup rollers 238, 239, and 254, respectively. The recording material is conveyed to the registration roller 255 by the pair of sheet feed rollers 235. A registration sensor 256 is located upstream of the registration roller 255 to detect passing of the recording material.

When the registration sensor 256 detects passing of the recording material, the pair of sheet feed rollers 235 stop. As a result, the recording material abuts on the halting registration roller 255 and stops. At this time, the posture of the recording material is adjusted so that the leading end of the recording material becomes perpendicular to the conveying path. This process is hereinafter referred to as "skew correction". The skew correction is executed to reduce the skew of an image to be formed on the recording material in the subsequent processes.

After the skew correction, the registration roller 255 is activated to resume the conveying operation to convey the recording material to the secondary transfer unit 231. The registration roller 255 is coupled to a drive source via a clutch.

Meanwhile, the surface of the photosensitive member 225 is uniformly charged to be negative with a predetermined potential by the primary charging unit 221 applied with a voltage. Then, the exposure unit 218 exposes the charged surface of the photosensitive member 225 to form an electrostatic latent image thereon. The exposure unit 218 turns on or off laser light based on image data sent from a controller 460 via a printer control interface (I/F) 215.

A development bias preset for each color is applied to the developing roller of the developing unit 223. The developing roller develops the electrostatic latent image with toner to form a toner image. The toner image is transferred to the transfer belt 226 by the transfer unit 220, and is further transferred to the conveyed recording material by the secondary transfer unit 231. The recording material having the toner image transferred thereon passes through a conveying path 268, and is conveyed to the fixing unit 234 by a fixing conveying belt 230.

Pre-fixing chargers 251 and 252 in the fixing unit 234 charge the toner image transferred on the recording material to supplement toner adsorption power, thereby preventing disturbance of the image.

Then, the fixing rollers 233 thermally fix the toner image on the recording material. The recording material having the toner image fixed thereon is conveyed by a sheet discharge roller 270, and is discharged onto a sheet discharge tray 242 via a conveying path switched to a sheet discharge path 258 by a sheet discharge flapper 257.

The toner remaining on the photosensitive member 225 is removed and collected by the cleaner unit 222. The photosensitive member 225 is uniformly deelectrified to near zero volt by the deelectrifying unit 271.

In the case of performing double-side printing, after an image is formed on the front surface of the recording material, the recording material is not discharged onto the sheet discharge tray 242, but an image is subsequently formed on the back surface of the recording material. An operation in the case of forming an image on the back surface of the recording material is described in detail. In the case of forming an image on the back surface of the recording material, the sheet discharge flapper 257 switches the conveying path to a back-side path 259 when a sensor 269 detects the recording material. Reversing rollers 260 convey the recording material which has passed the back-side path 259 to a double-side reversing path 261. After the recording material is conveyed to the double-side reversing path 261 by a feed directional width, the moving direction is switched by the reverse driving of the reversing rollers 260. Then, double-side path conveying rollers 262 convey the recording material having the front side down to a double-side path 263.

The recording material is conveyed on the double-side path 263 toward sheet re-feed rollers 264. When a sheet re-feed sensor 265 detects passing of the recording material (after passing of a predetermined time in this embodiment), the conveying operation is interrupted. The recording material abuts on the halting sheet re-feed rollers 264 and stops. At this time, the posture of the recording material is adjusted so that the leading end of the recording material becomes perpendicular to the conveying path. This process is hereinafter referred to as "skew re-correction".

The skew re-correction is executed to reduce the skew of an image to be formed on the back side of the recording material. After the skew re-correction, the sheet re-feed rollers 264 are activated. The sheet re-feed rollers 264 convey the recording material having the front side down onto the conveying path 266 again. The subsequent image forming operation is the same as the above-mentioned image forming operation, and hence its description is omitted. The recording material having the images formed on both sides is discharged onto the sheet discharge tray 242.

Note that, the image forming unit 300 can continuously feed recording materials even at the time of double-side printing. However, the image forming unit 300 has a single mechanism for, for example, forming an image on a recording material and fixing a formed toner image, and hence printing on the front side and printing on the back side cannot be carried out at the same time. Therefore, at the time of double-side printing, the image forming unit 300 alternately forms an image on a recording material fed from the cassette 240 or 241 or the manual feed unit 253 and an image on a recording material which is reversed and re-fed for back-side printing.

Figure 3:
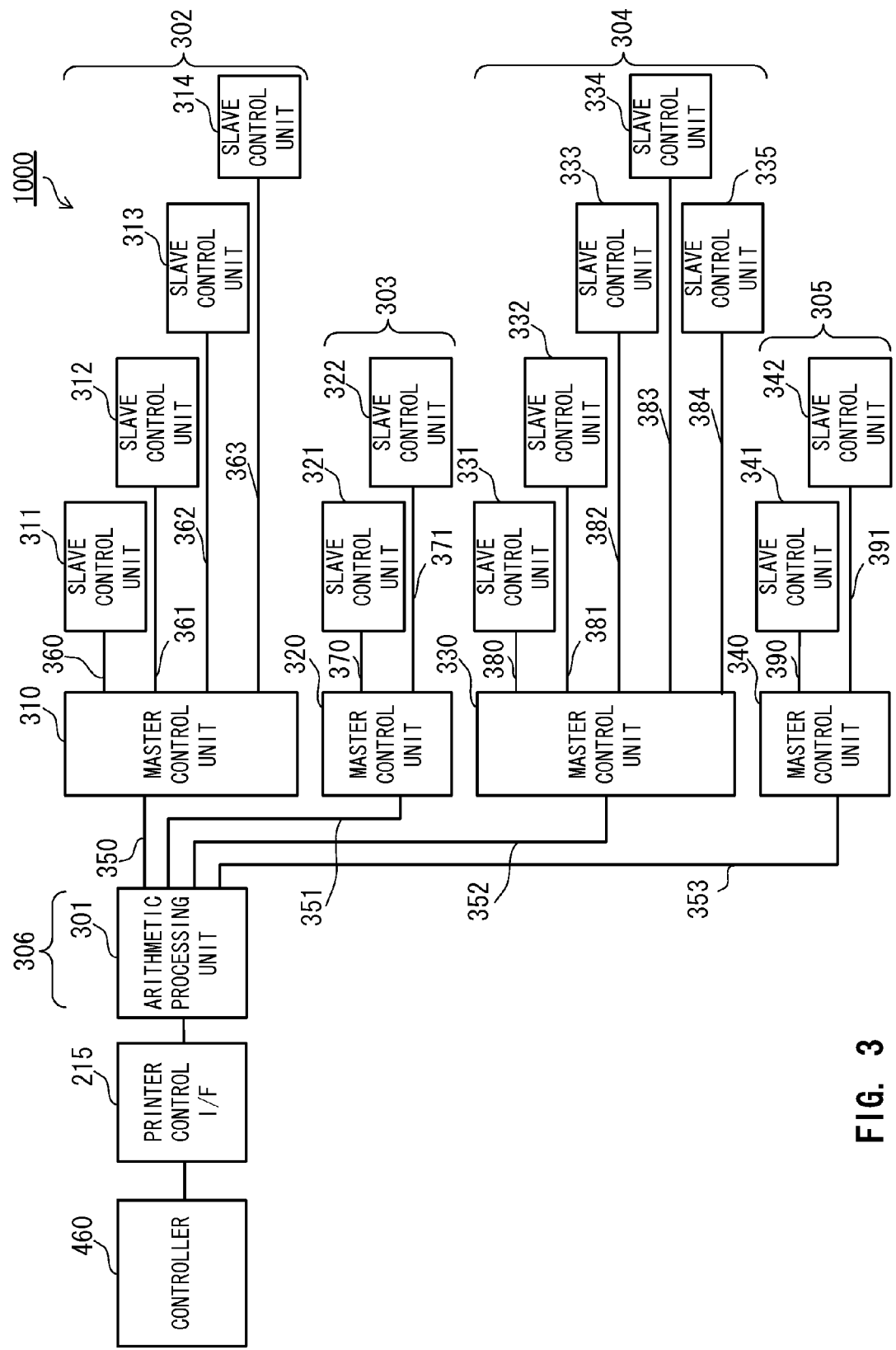
FIG. 3 is an exemplary configuration diagram of control modules.

The image forming unit 300 separates the individual components which have been described referring to FIG. 2 into four modules: a conveying module A; a conveying module B; an image forming module; and a fixing module. The four modules are respectively controlled by control modules. Four control modules autonomously control the connected load. A master module 306 performs the overall control of those four control modules so that the control modules function in cooperation with one another. FIG. 3 is a diagram illustrating an example of the configuration of the control modules.

An arithmetic processing unit 301 performs the general operation control of the image forming unit 300 based on an instruction and image data sent from the controller 460 via the printer control I/F 215. A conveying module A 302, a conveying module B 303, an image forming module 304, and a fixing module 305 for forming an image respectively include master control units 310, 320, 330, and 340 which control the operations of the respective modules. Slave control units 311 to 314 are controlled by the master control unit 310. Slave control units 321 and 322 are controlled by the master control unit 320. Slave control units 331 to 335 are controlled by the master control unit 330. Slave control units 341 and 342 are controlled by the master control unit 340.

The arithmetic processing unit 301 is connected to the plurality of master control units 310, 320, 330, and 340 via one-to-one connected (peer-to-peer connected) serial communication buses 350 to 353. The master control unit 310 is connected one to one to the plurality of slave control units 311 to 314 via serial communication buses 360 to 363, respectively. Likewise, the master control unit 320 is connected to the slave control units 321 and 322 via serial communication buses 370 and 371, respectively. The master control unit 330 is connected one to one to the slave control units 331 to 335 via serial communication buses 380 to 384, respectively. The master control unit 340 is connected to the slave control units 341 and 342 via serial communication buses 390 and 391, respectively.

(Conveying Module B)

Figure 4:
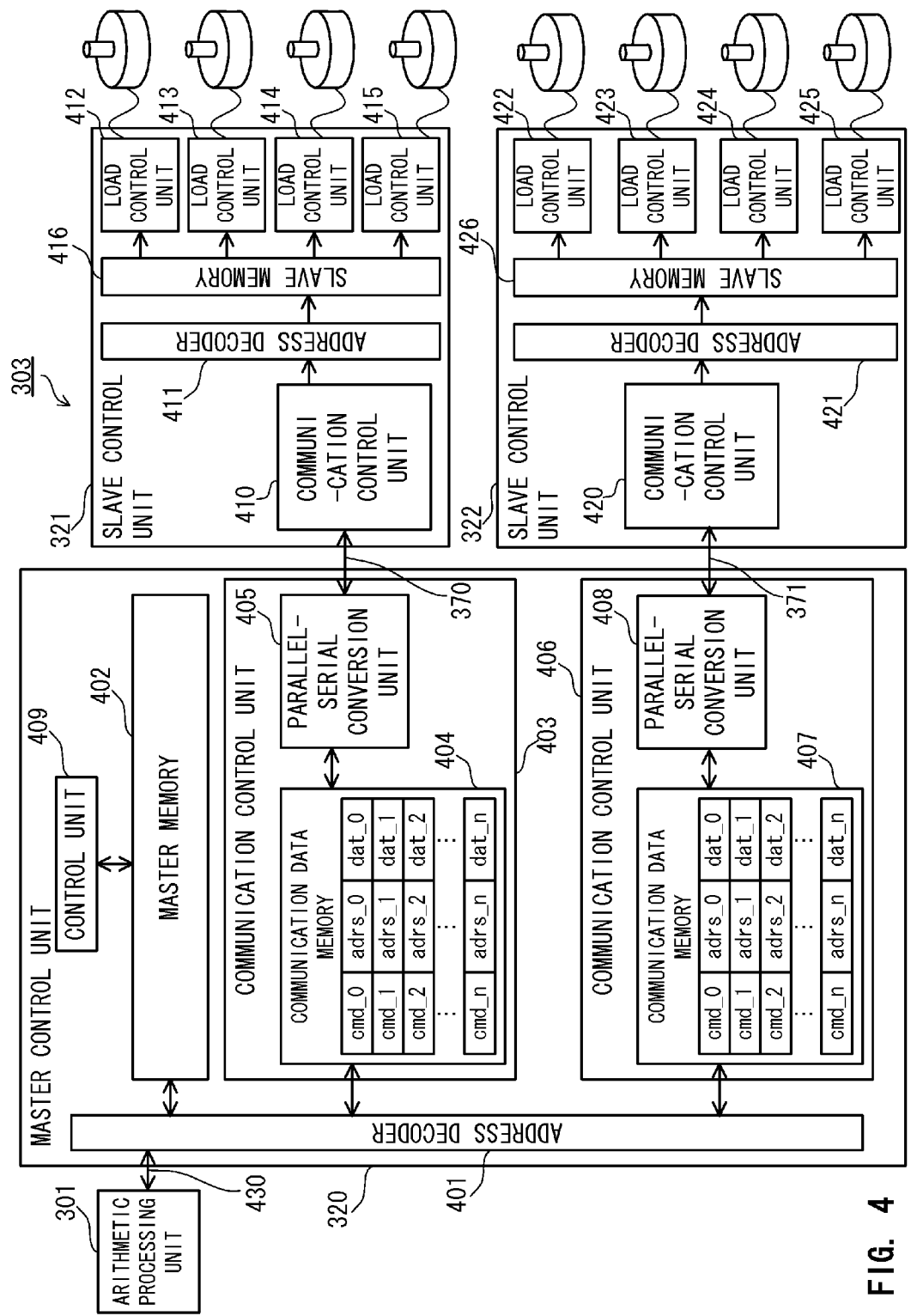
FIG. 4 is an exemplary detailed configuration diagram of a conveying module B.

FIG. 4 is an exemplary detailed configuration diagram of the conveying module B 303. As described above, the conveying module B 303 includes the master control unit 320, the slave control unit 321, and the slave control unit 322. Note that, the conveying module A 302, the image forming module 304, and the fixing module 305 are different only in the number of slave control units, and have the same configurations of the master control unit and the slave control units to operate in the same manner. Therefore, descriptions of the other respective control modules are omitted.

The master control unit 320 executes processing in accordance with to an instruction from the arithmetic processing unit 301. The master control unit 320 includes an address decoder 401, a master memory 402, a communication control unit 403, a communication control unit 406, and a control unit 409. The communication control unit 403 includes a communication data memory 404 and a parallel-serial conversion unit 405. The communication control unit 406 includes a communication data memory 407 and a parallel-serial conversion unit 408.

The address decoder 401 decodes the address and the data input from the arithmetic processing unit 301, to thereby analyze address information in a system address space and identify a write destination for data from the arithmetic processing unit 301. The communication data memories 404 and 407 are formed of, for example, first-in, first-out (FIFO).

The communication control units 403 and 406 write/read communication data formed of a plurality of bits stored in the communication data memories 404 and 407, respectively. The communication control units 403 and 406 cause the parallel-serial conversion units 405 and 408, respectively, to perform parallel-serial conversion for the communication data that has been read from the communication data memories 404 and 407. The communication data converted into serial data is transmitted to the slave control units 321 and 322 via the serial buses 370 and 371, respectively.

The control unit 409 executes the processing in accordance with the instruction from the arithmetic processing unit 301 based on the data written to the master memory 402.

The slave control units 321 and 322 execute the processing in accordance with the instruction included in the serial data transmitted from the master control unit 320. The slave control units 321 and 322 include communication control units 410 and 420, address decoders 411 and 421, load control units 412 to 415 and 422 to 425, and slave memories 416 and 426, respectively. The communication control units 410 and 420 perform serial-parallel conversion for the serial data transmitted via the serial buses 370 and 371, respectively, into parallel data. The address decoders 411 and 421 write data to the slave memories 416 and 426, respectively, based on addresses of slave address spaces. The load control units 412 to 415 and 422 to 425 control loads such as stepping motors based on the data written to the slave memories 416 and 426, respectively.

(Address Space)

Figure 5A:
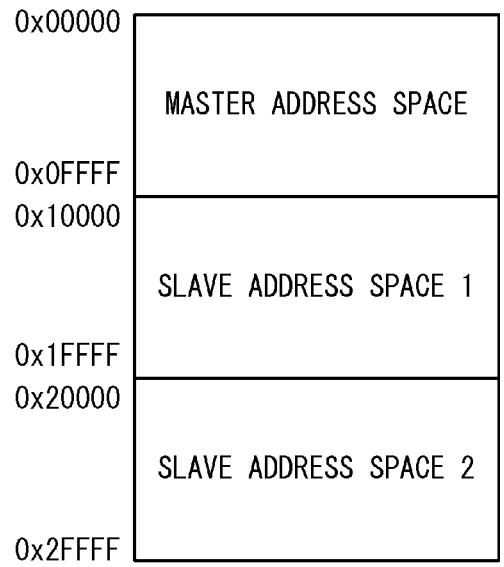
FIG. 5A is an explanatory diagram of a system address space according to this embodiment.

FIG. 5A is an explanatory diagram of the system address space according to this embodiment.

The system address space is a virtual space obtained by integrating a master address space of the master memory 402 included in the master control unit 320 and the slave address spaces of the slave memories 416 and 426 included in the slave control units 321 and 322, respectively. The system address space indicated by the addresses "0x00000" to "0x0FFFF" represents the master address space of the master memory 402 included in the master control unit 320. The system address space indicated by the addresses "0x10000" to "0x1FFFF" represents the slave address space of the slave memory 416 included in the slave control unit 321. The system address space indicated by the addresses "0x20000" to "0x2FFFF" represents the slave address space of the slave memory 426 included in the slave control unit 322.

Figure 5B:
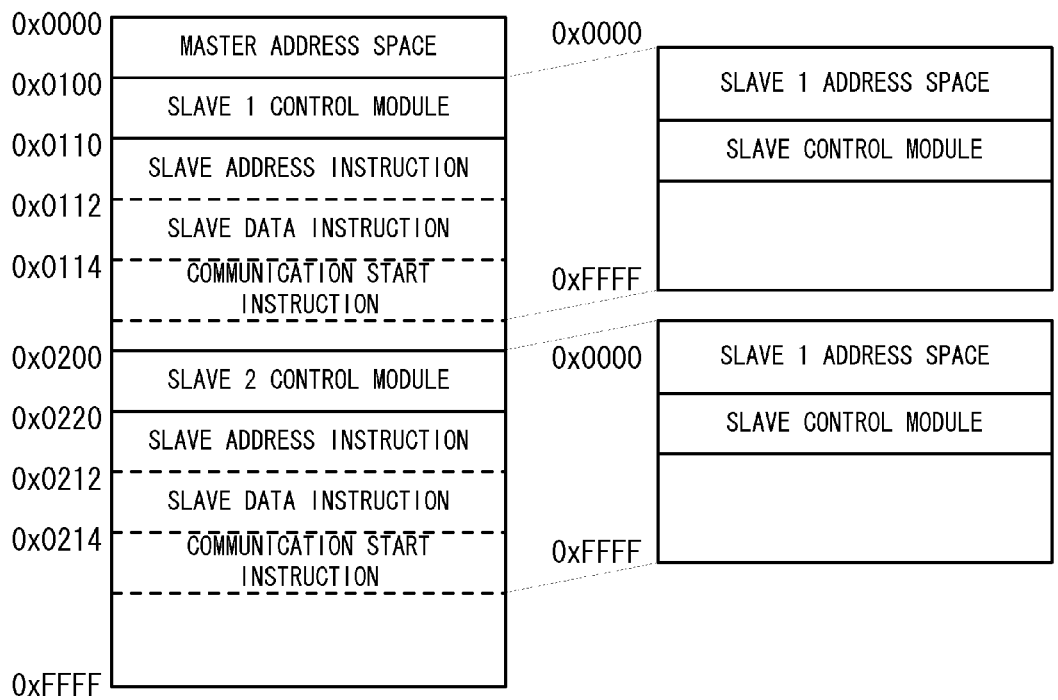
FIG. 5B is an explanatory diagram of a conventional system address space.

FIG. 5B is an explanatory diagram of a conventional system address space. Conventionally, a virtual space obtained by integrating a master address space of a master memory included in a master control unit and slave address spaces of slave memories included in slave control units, respectively, is not used. A master address space is conventionally indicated by the addresses "0x0000" to "0xFFFF", but this address space includes address spaces used for instructions to write data to slave memories of respective slave control units. Conventionally, when instructing a slave control unit to perform processing, an arithmetic processing unit performs the following writing to a slave address space ranging, for example, from "0x0100" to "0x01FF" in a master address space.

First, the address of the address space included in that slave control unit is written to the address "0x0110". Subsequently, data for instructing that slave control unit to perform the processing (slave data instruction) is written to the address "0x0112". Lastly, data for instructing that slave control unit to start communications is written to the address "0x0114". In response to the writing to the address "0x0114", a master control unit transmits, to that slave control unit, address data written to the address "0x0110" and data for instructing to perform the processing written to the address "0x0112". In this manner, conventionally, in order to issue instructions to slave control units, it is necessary to access the master address space at least three times, which increases a processing load on the master control unit. In contrast, according to the above-noted embodiment of the present invention, by using the system address space, issuance of the instructions to the slave control units 321 and 322 can be realized merely by simultaneously transmitting a write signal, a system address space address, and data once.

(Processing Procedure)

Figure 6:
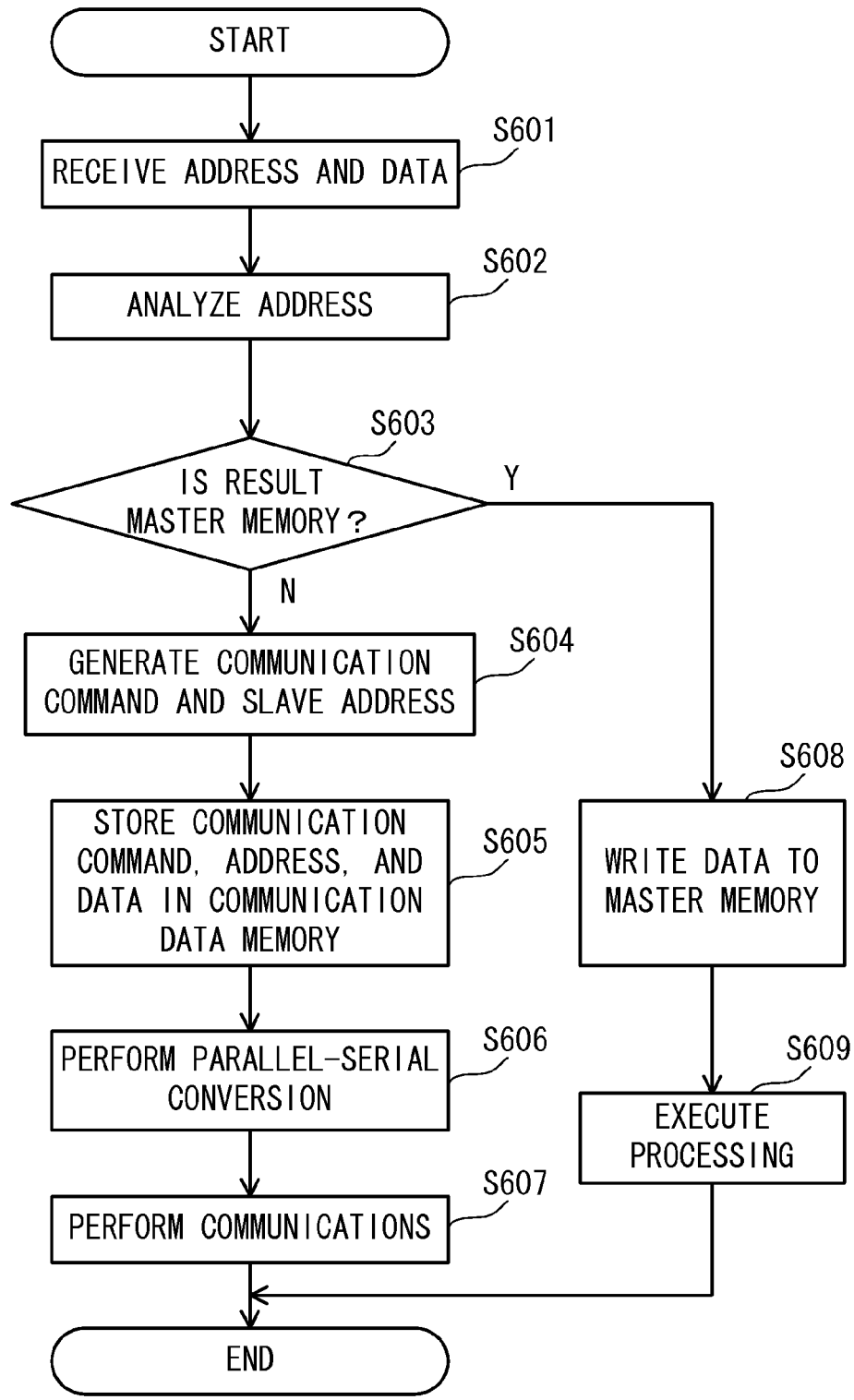
FIG. 6 is a flowchart illustrating a processing procedure for communication processing.

FIG. 6 is a flowchart illustrating a processing procedure for communication processing performed by the master control unit 320.

The address decoder 401 of the master control unit 320 receives transmission data including the address in the system address space and the data from the arithmetic processing unit 301 via a parallel bus 430 (S601).

The address decoder 401 of the master control unit 320 analyzes the address in the system address space, and selects any one of the master memory 402 and the communication control units 403 and 406 (S602).

The address decoder 401 of the master control unit 320 determines whether or not a selection result of Step S602 is the master memory 402 (S603). When the master memory 402 is selected, the address decoder 401 writes the received data to the address of a master memory address space corresponding to the address in the system address space of the master memory 402 (S603: Y, S608). The control unit 409 executes the processing corresponding to the written data (S609).

When the selection result Step S602 is not the master memory 402, the address decoder 401 generates communication command information and the address in the slave address space based on the received data (S603: N, S604). The communication control unit 403 stores the generated communication command, the address in the slave address space, and the data in a communication data memory of the selected communication control unit (S605). This embodiment is described by taking the case where the communication control unit 403 is selected, but the same processing is performed in the case where the communication control unit 406 is selected. The parallel-serial conversion unit 405 converts the communication command, the address, and the data that are stored in the communication data memory 404 into the serial data (S606). The communication control unit 403 sequentially transmits the generated serial data to the slave control unit 321 via the serial bus 370 (S607). After all pieces of serial data have been transmitted, the communications are brought to an end.

The communication control unit 410 of the slave control unit 321 receives the serial data. The address decoder 411 writes data to the slave memory 416 based on the address in the slave address space. Then, the load control units 412 to 415 execute load control based on the data written to the slave memory 416.

Figure 7A:
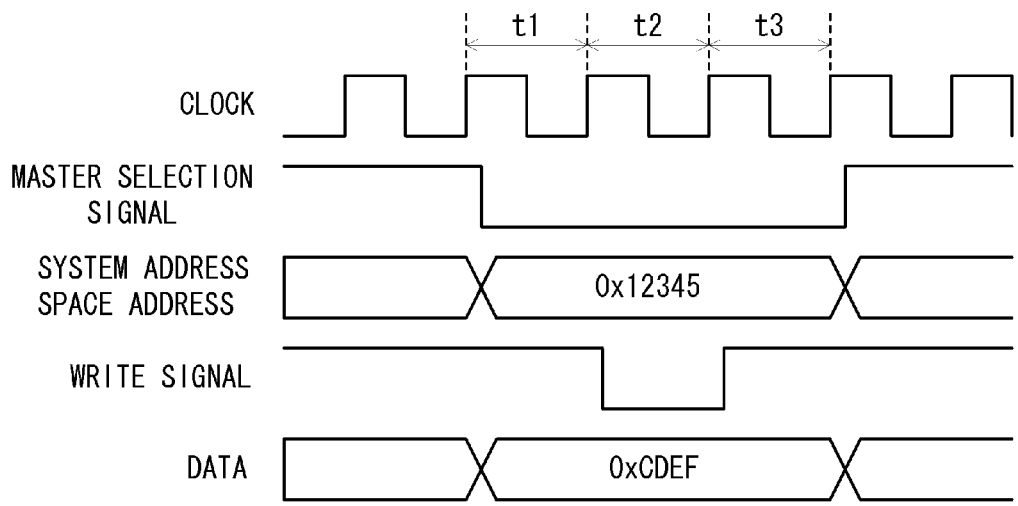
FIG. 7A is a timing chart of a parallel bus.
Figure 7B:
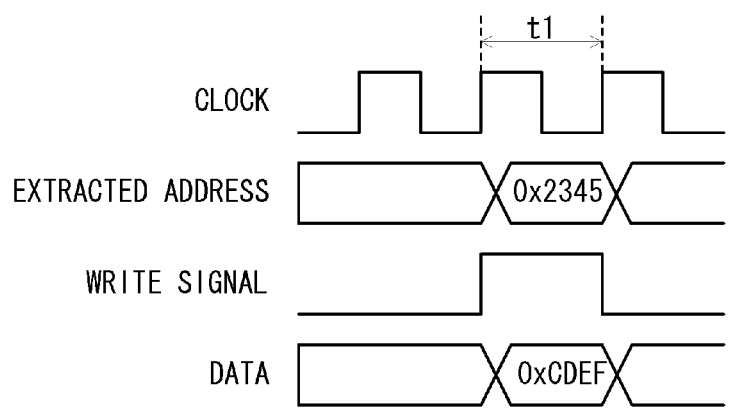
FIG. 7B is a timing chart of an internal bus.
Figure 7C:
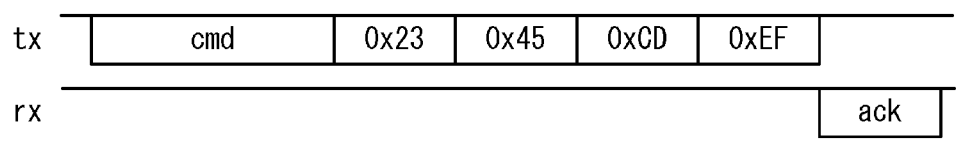
FIG. 7C is a timing chart of a serial bus.

FIG. 7A is a timing chart of the transmission data transmitted via the parallel bus 430 for connecting the arithmetic processing unit 301 to the master control unit 320. FIG. 7B is a timing chart of data transmitted via an internal bus for connecting the address decoder 401 to the communication control units 403 and 406 in the master control unit 320. FIG. 7C is a timing chart of data transmitted via the serial buses 370 and 371 for connecting the master control unit 320 to the slave control units 321 and 322.

FIG. 7A to FIG. 7C illustrate examples of the transmission data used when data "CDEF" is written to an address "2345" of the slave control unit 321.

As illustrated in FIG. 7A, the parallel bus 430 communicates a clock, a master selection signal, the system address space address, the write signal, and the data in parallel. The transmission data transmitted via the parallel bus 430 has the master selection signal asserted for three clocks (t1, t2, and t3) relative to a rising edge of the clock. In the system address space address for designating the system address space, the data (0x12345) indicating the system address space is sent while the master selection signal is asserted. The write signal for designating whether or not to write the data to the system address space is asserted for one clock (t2) relative to the rising edge of the clock. As the data to be written to the system address space, the data (0xCDEF) is sent while the master selection signal is asserted.

The address decoder 401 analyzes the system address space address, and determines a transmission destination. The address decoder 401 selects any one of the master memory 402, the slave control unit 321, and the slave control unit 322 based on an upper address of the system address space. In this embodiment, the master memory 402 is selected when the upper address is "0x0", the slave control unit 321 is selected when the upper address is "0x1", and the slave control unit 322 is selected when the upper address is "0x2". In the example illustrated in FIG. 7A, the upper address is "0x1", and hence the slave control unit 321 is selected. Based on this selection result, the address decoder 401 selects a writing destination for the data to be written by using the internal bus. In the example illustrated in FIG. 7A, the upper address indicates the slave control unit 321, and hence the communication control unit 403 corresponding to the slave control unit 321 is selected as the write destination.

As illustrated in FIG. 7B, the internal bus communicates the clock, an extracted address, the write signal, and the data in parallel.

From the transmission data input from the parallel bus 430, the address decoder 401 extracts a predetermined address (0x2345) from the system address space address, and transmits the predetermined address as the extracted address.

When the master memory 402 is selected, the extracted predetermined address indicates the address of the master memory 402. On the other hand, when the slave control unit 321 or 322 is selected, the extracted predetermined address indicates the address in the slave address space. This processing for extracting the predetermined address from the system address space address corresponds to the processing for generating the address in the slave address space in Step S604.

Then, the address decoder 401 asserts the write signal in the internal bus for one clock relative to the rising edge of the clock based on the asserted write signal input from the parallel bus 430. This processing for asserting the write signal in the internal bus corresponds to the generation of the communication command performed in Step S604.

In addition, the address decoder 401 transmits the data (0xCDEF) input from the parallel bus 430 as it is at the same timing as the extracted address.

The serial buses 370 and 371 are buses for transmitting the serial data read from the communication data memories 404 and 407 and converted by the parallel-serial conversion units 405 and 408 to the slave control units 321 and 322, respectively. Referring to FIG. 7C, the description is made by taking as an example the serial bus 370 for connecting the communication control unit 403 to the slave control unit 321. This description is directed to the communications performed in Step S607.

In the serial bus 370, first, a command (cmd) generated from the input data from the internal bus is transmitted. Subsequently, the high-order bits (0x23) of the address input from the internal bus are transmitted. Subsequently, the low-order bits (0x45) of the address input from the internal bus are transmitted. Subsequently, the high-order bits (0xCD) of the input data from the internal bus are transmitted. Subsequently, the low-order bits (0xEF) of the input data from the internal bus are transmitted.

In this embodiment, the serial bus 370 is of a start-stop synchronization system, but may be of a clock synchronization system. A check sum or CRC data may be added to the serial data after the low-order bits (0xEF) of the input data.

After all the pieces of serial data have been transmitted, the slave control unit 321 transmits ack data (acknowledgment data) for notifying that the serial data has been received to the communication control unit 403. The communication control unit 403 normally receives the ack data, to thereby finish normal communications from the arithmetic processing unit 301 to the slave control unit 321. With this configuration, the load control units 412 to 415 of the slave control unit 321 can be controlled.

As described above, in this embodiment, the system address space being a space obtained by integrating the master address space and the slave address space is used in the electrophotographic system controlled by the plurality of control modules in a distributed manner. The arithmetic processing unit 301 specifies the system address space, to thereby cause the master control unit 320 to analyze the specified address and identify the write destination for data from the arithmetic processing unit 301. When the write destination is the master address space, the master control unit 320 writes the data to the master memory 402, and executes the processing based on the data written to the master memory 402.

When the write destination is the memories of the slave control units 321 and 322, the communication control units 403 and 406 convert the address information in the system address space into the address information on the slave address space of a slave memory, respectively. After that, write commands, the address information on the slave address space, and the data are written to the communication data memories 404 and 407. The communication control units 403 and 406 transmit the commands, the address information, and the data written to the communication data memories 404 and 407 to the slave control units 321 and 322 via the serial buses 370 and 371, respectively.

The slave control units 321 and 322 writes the data received from the master control unit 320 to the address of the memory corresponding to the address information on the slave address space received from the master control unit 320. Further, by controlling the load based on the data written to the memory, the processing load on the master control unit 320 can be prevented from increasing even when a transmission amount of the data increases, which causes no trouble in operation control.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-162833, filed Jul. 23, 2012, which is hereby incorporated by reference herein in its entirety.

What is claimed is:

1. An information processing system, comprising:
an arithmetic processing unit;
a master control unit configured to execute processing in accordance with an instruction from the arithmetic processing unit;
a slave control unit comprising a slave memory, configured to control a load in accordance with the instruction from the arithmetic processing unit;
a first communication line configured to connect the arithmetic processing unit to the master control unit; and
a second communication line configured to connect the master control unit to the slave control unit, wherein:

the master control unit comprises an address decoder, a master memory, and a communication data memory;

the arithmetic processing unit configured to transmit a write command, address information in a system address space, and data to the master control unit via the first communication line;

the address information in the system address space is information for designating an address in a system address space being a space obtained by integrating a master memory address space of the master memory and a slave memory address space of the slave memory;

the address decoder comprised in the master control unit configured to analyze the address information in the system address space received from the arithmetic processing unit, and to select a writing destination for the data received from the arithmetic processing unit;

the master control unit configured to write, when the address decoder selects the master memory as the writing destination, the data received from the arithmetic processing unit to the address of the master memory address space of the master memory corresponding to the address information in the system address space, and to execute the processing based on the data written to the master memory; and the master control unit configured to generate, when the address decoder selects the slave memory as the writing destination, address information on the slave memory address space based on the address information in the system address space, to write the write command, the address information on the slave memory address space, and the data to the communication data memory, and to transmit the write command, the address information on the slave memory address space, and the data written to the communication data memory to the slave control unit via the second communication line.

2. The information processing system according to claim 1, wherein the slave control unit configured to write the data received from the master control unit to the address of the slave memory corresponding to the address information on the slave memory address space received from the master control unit, and to control the load based on the data written to the slave memory.

3. The information processing system according to claim 1, wherein:

the address decoder configured to select a writing destination for the data received from the arithmetic processing unit based on the data on a predetermined address of the address information in the system address space; and the address decoder configured to generate the address information on the slave memory address space by extracting the predetermined address from the address information in the system address space.

4. The information processing system according to claim 1, wherein:

the first communication line comprises a parallel bus; and
the second communication line comprises a serial bus.

5. An information processing method, which is executed by a system comprising:

an arithmetic processing unit;

a master control unit comprising an address decoder, a master memory, and a communication data memory, configured to execute processing in accordance with an instruction from the arithmetic processing unit;

a slave control unit comprising a slave memory, configured to control a load in accordance with the instruction from the arithmetic processing unit;

a first communication line configured to connect the arithmetic processing unit to the master control unit; and a second communication line configured to connect the master control unit to the slave control unit;

the system configured to form a system address space being a space obtained by integrating a master memory address space of the master memory and a slave memory address space of the slave memory;

the information processing method comprising:

transmitting, by the arithmetic processing unit, a write command, address information in the system address space, and data to the master control unit via the first communication line;

the address information in the system address space is information for designating an address in the system address space;

analyzing, by the address decoder of the master control unit, the address information in the system address space received from the arithmetic processing unit, and selecting a writing destination for the data received from the arithmetic processing unit;

writing, by the master control unit, when the address decoder selects the master memory as the writing destination, the data received from the arithmetic processing unit to an address of the master memory address space of the master memory corresponding to the address information in the system address space, and executing the processing based on the data written to the master memory;

generating, by the master control unit, when the address decoder selects the slave memory as the writing destination, address information on the slave memory address space based on the address information in the system address space, and writing the write command, the address information on the slave memory address space, and the data to the communication data memory; and transmitting, by the master control unit, the write command, the address information on the slave memory address space, and the data written to the communication data memory to the slave control unit via the second communication line.

6. The information processing method according to claim 5, further comprising writing, by the slave control unit, the data received from the master control unit to an address of the slave memory corresponding to the address information on the slave memory address space received from the master control unit, and controlling the load based on the data written to the slave memory.

7. The information processing method according to claim 5, further comprising:

selecting, by the address decoder, a writing destination for the data received from the arithmetic processing unit based on the data on a predetermined address of the address information in the system address space; and generating, by the address decoder, the address information on the slave memory address space by extracting the predetermined address from the address information in the system address space.

8. The information processing method according to claim 5, further comprising:

transmitting, by the arithmetic processing unit, the write command, the address information in the system address space, and the data to the master control unit through parallel communications via the first communication line; and transmitting, by the master control unit, the write command, the address information on the slave memory address space, and the data to the slave control unit through serial communications via the seconds communication line.

9. A non-transitory computer-readable storage medium having stored thereon a program capable of causing a computer to execute the information processing method according to claim 5.

* * * * *